United States Patent [19]
Bush

[11] 3,912,012
[45] Oct. 14, 1975

[54] METHOD FOR REMOVING PLASTIC FROM THE INSIDE DIAMETER OF WELLBORE CASING

[75] Inventor: Roy E. Bush, New Orleans, La.

[73] Assignee: Continental Oil Company, Ponca City, Okla.

[22] Filed: Aug. 9, 1974

[21] Appl. No.: 495,931

[52] U.S. Cl. .................. 166/285; 166/295; 166/311
[51] Int. Cl.² .................. E21B 33/138; E21B 37/02
[58] Field of Search ........... 166/311, 312, 285, 295, 166/294, 292

[56] References Cited
UNITED STATES PATENTS

| | | | |
|---|---|---|---|
| 586,001 | 7/1897 | Ballard | 166/175 |
| 1,600,577 | 9/1926 | Crickmer | 166/173 |
| 2,048,136 | 7/1936 | O'Conner | 166/173 |
| 2,219,325 | 10/1940 | Maness | 166/292 X |
| 2,652,120 | 9/1953 | Hodges | 166/173 |
| 3,212,577 | 10/1965 | Holbert et al. | 166/295 |
| 3,294,165 | 12/1966 | Meijs et al. | 166/295 |

*Primary Examiner*—Stephen J. Novosad
*Attorney, Agent, or Firm*—F. Lindsey Scott

[57] ABSTRACT

A scraper for removing plastic from the inside diameter of a wellbore, the scraper comprising a cylindrical body including fittings for mounting the cylindrical body in a tubing string, a plurality of passageways fluidly communicating the upper and lower surfaces of the cylindrical body and a cutting means positioned substantially at the junction of the outer diameter and the lower surface. An apparatus for use with the scraper is disclosed as well as an improved method for removing plastic from the inside diameter of the wellbore casing.

2 Claims, 6 Drawing Figures

METHOD FOR REMOVING PLASTIC FROM THE INSIDE DIAMETER OF WELLBORE CASING

This invention relates to scrapers for removing plastic and the like from the inside diameter of wellbore casings.

This invention further relates to an improved method for removing plastic and the like from the inside diameter of wellbore casings.

Numerous scrapers and the like are known for removing various materials such as paraffins, cement, plastic and the like from the inside diameters of wellbores. Over the years the petroleum industry in particular has found it necessary and desirable to periodically clean various materials from the inside diameter of wellbore casings. It is especially desirable that materials be cleaned from the inside diameter of wellbore casings after well treatments of various sorts such as cement squeeze jobs, plastic injection to consolidate unconsolidated formations and the like. Since a variety of techniques are used for such injections a variety of wellbore cleaning tools has been developed.

In one commonly used technique sandy or unconsolidated formations are consolidated by completing a wellbore through such unconsolidated formations, casing the wellbore and thereafter perforating the casing in the vicinity of the unconsolidated formation. A tubing string is then run in the well to a depth slightly below the perforations and a packer is positioned above the perforations. Plastic materials such as thermosetting resins including catalysts, carriers and the like are then injected into the unconsolidated formation to consolidate the unconsolidated formation by pumping the materials down the tubing string, through the perforations and into the unconsolidated formation. Normally the plastic injection is followed by an overflush of a suitable solvent and the like. It is then necessary to pull the tubing string and packer and run a drill bit, casing scraper or the like down the well to clean the residual plastic from the inside diameter of the casing in the vicinity of the perforations in the wellbore casing. Obviously such a treatment results in running tubing in the well twice which is a time consuming and expensive operation.

It is an object of the present invention to provide a method for cleaning plastic from the inside diameter of a wellbore by an improved method which obviates the necessity for a second trip downhole with a tubing string.

It has now been found that the objectives of the present invention are achieved by the use of a scraper comprising a cylindrical body having an outer diameter, a lower surface and an upper surface and including means for positioning the cylindrical body in a tubing string; a plurality of passageways fluidly communicating the upper and lower surfaces and a cutting means positioned substantially at the junction of the outer diameter and the lower surface.

The apparatus and scraper are useful in an improved method for treating subterranean formations penetrated by a wellbore containing a casing wherein the method consists essentially of perforating the casing in a portion of the wellbore penetrating a selected formation, positioning a tubing string in the wellbore so that the lower terminus of the tubing string is below the selected formation, positioning a packer above the selected formation, injecting plastic materials into the selected formation through the tubing string and the perforations, flushing the plastic materials into the selected formation by the injection of a suitable liquid into the selected formation through the tubing string and perforations; removing the packer and tubing string from the wellbore and passing a casing scraper through the casing to clean the plastic from the inside diameter of the casing by an improvement comprising; positioning a scarper means beneath the packer means and above the selected formation; and, lowering the scraper means past the selected formation after the injection of the plastic material and flushing, but prior to removing the packer and tubing string, thereby removing plastic from the inside diameter of the casing.

Figure 1:
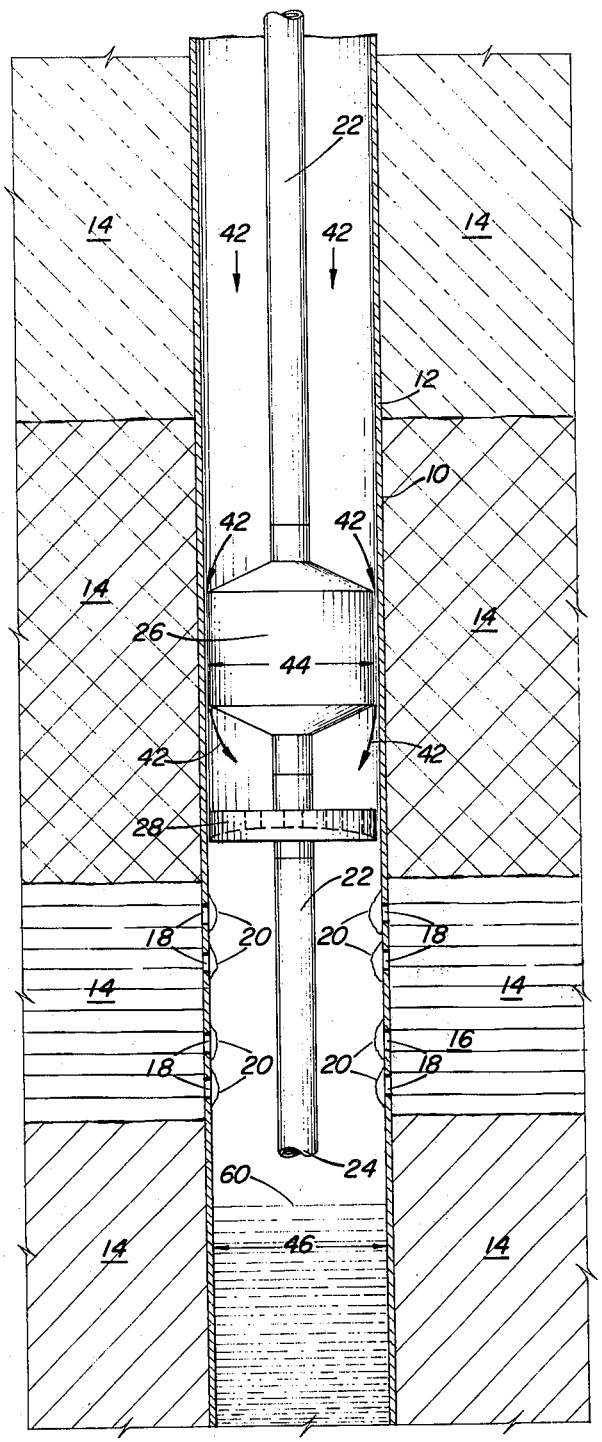
FIG. 1 shows an embodiment of the apparatus of the present invention positioned in a wellbore.

With reference to all of the figures and FIG. 1 in particular, an apparatus for removing plastic from the inside diameter of a wellbore is shown. A wellbore 10 containing a casing 12 and penetrating subterranean formations 14 is shown. A selected formation 16 is included. Casing 12 has been perforated by a series of perforations 18 in the portion of casing 12 adjacent selected formation 16. Plastic has been injected into selected formation 16 leaving residual plastic 20 on the inside diameter 46 of casing 12.

A tubing string 22 having a lower terminus 24 is shown in position in wellbore 10. A packer means 26 is positioned on tubing string 22 above selected formation 16. A scraper means 28 is positioned on tubing string 22 above selected formation 16 and below packer means 26.

Figure 2:
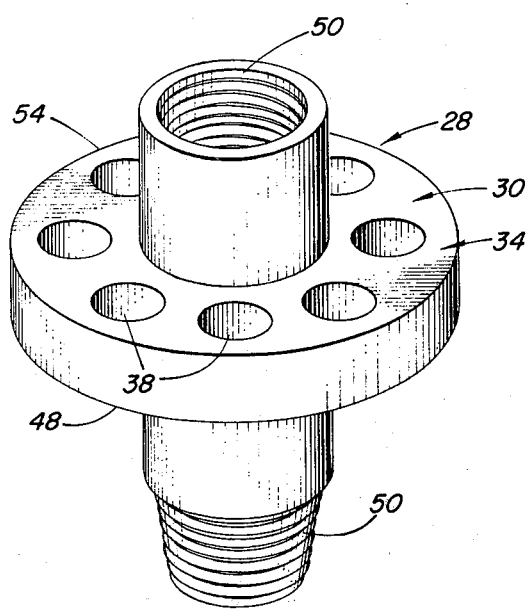
FIG. 2 is a view of an embodiment of the scraper of the present invention.
Figure 3:
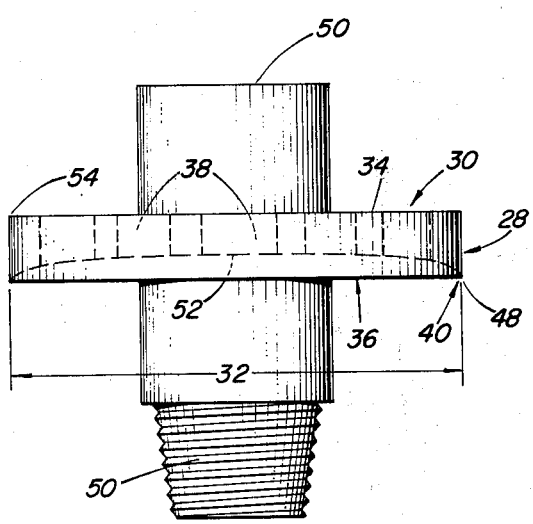
FIG. 3 is a cross-sectional view of an embodiment of the scraper of the present invention.
Figure 4:
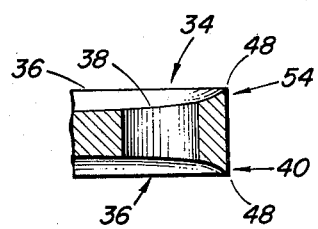
FIG. 4 is a cross-sectional view of a further embodiment of the scraper of the present invention.
Figure 5:
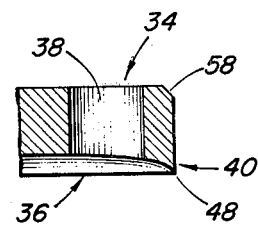
FIG. 5 is a cross-sectional view of a further embodiment of the present invention; and, FIG. 6 is a cross-sectional view of a further embodiment of the present invention.
Figure 6:
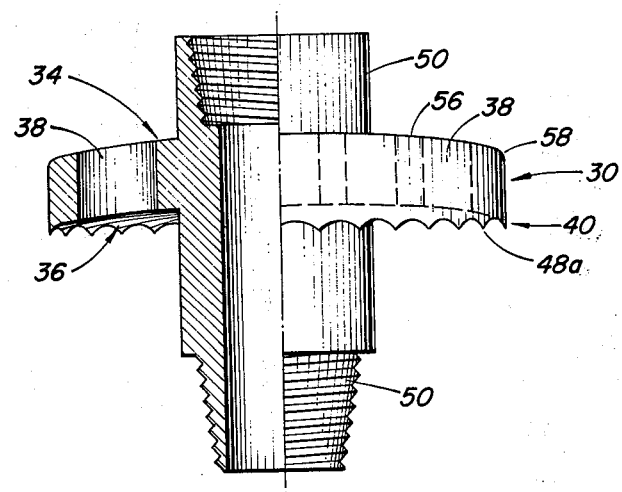

With reference to FIG. 2 and FIG. 3, scraper 28 comprises a cylindrical body 30 having an outer diameter 32. Scraper 28 includes an upper surface 34 and a lower surface 36 which are fluidly communicated by a plurality of passageways 38. Scraper 28 also includes a cutting means 40 and a cutting edge 48. Cutting means 40 desirably comprises a sharp junction of lower surface 36 with outer diameter 32 as shown in FIG. 3 or a cutting edge 48 as shown in FIG. 4. Scraper 28 includes means 50 for positioning scraper 28 on tubing string 22 such as pipe fittings as shown in FIGS. 2, 3 and 6. Scraper 28 may take a variety of configurations, one of which is shown in FIG. 3 wherein lower surface 36 comprises a concave surface 52. A second cutting means 54 may be included in FIG. 3. Second cutting means 54 desirably comprises a sharp junction of upper surface 34 with outer diameter 32 or a cutting edge 48 as shown in FIG. 4. When scraper 28 includes second cutting means 54 upper surface 34 is desirably concave as shown in FIG. 4. In such embodiments scraper means 28 has an effective cutting action both in the upward and downward direction. Such an embodiment is desirable in some applications. In most applications it will be desired that the cutting action be achieved during the downward movement only and that scarper means 28 be readily moved upwardly through inside diameter 12 of casing 10. In such embodiments upper surface 34 is desirably a convex surface 56 with the junction of upper surface 34 and outer diameter 32 forming a rounded surface 58 as shown in FIGS. 5 and 6. Clearly such a configuration lends itself more readily to moving scraper means 28 freely upward in inside diameter 12 of wellbore casing 10 than does an embodiment such as shown in FIG. 4. The choice of whether a double cutting action is desired or whether the ease of withdrawal is desired is dependent upon many variables known to those skilled in the art. In most instances it is desirable that scraper 28 cut only during downward movement.

With respect to FIG. 1, in the practice of the present invention, tubing string 22 is positioned in a wellbore casing 12 and plastic is injected through tubing string 22 and perforations 18 into selected formation 16. It will be noted that a liquid level 60 is present in wellbore 10 and the injected plastic material tends to float on liquid level 60 and is readily forced into selected formation 16 by injection through tubing string 22. In many embodiments a flushing liquid is forced into selected formation 16 after the plastic has been injected. Tubing string 22 is then lowered to pass scraper 28 through inside diameter 46 of casing 12 past perforations 18 thus removing plastic 20 from inside diameter 46 of casing 12. Simultaneously with the lowering of tubing string 22 and scraper 28 fluid injection is commenced through casing 12 so that fluid flows down casing 12 as shown by arrows 42 around packer 26 which is in an unextended position having an unextended diameter 44 which allows the passage of fluid between packer 26 and casing 12. The fluid thus flows down casing 12 between casing 12 and packer 28 and through perforations 38 thus flushing plastic 20 ahead of scraper 28 as plastic 20 is removed from inside diameter 46 of casing 12 by the passage of scraper 28. Fluid then flows up tubing 22 carrying the lighter plastic portions while the heavier plastic portion may sink into the lower portion of the well and the like. Desirably the fluids used are liquids. An important advantage achieved by use of the invention described hereinbefore is that the possibility of plastic particles wedging between packer 26 and casing 12 is minimized thus allowing the use of scraper 28 beneath packer 26 to clean plastic 20 from inside diameter 46 of casing 12. It is clear that tubing string 22 after lowering can be raised leaving inside diameter 46 of casing 12 in a cleaned condition and suitable for further use in the production of oil from wellbore 10 and the like.

It is clear that by the use of the method and apparatus described above a substantial improvement in the cleaning of plastic 20 from inside diameter 46 of wellbore 12 has been achieved in that it is no longer necessary to pull tubing 22 and packer 26 and thereafter run a second tubing string including a bit, casing scraper and the like into casing 12. Clearly the efficiency of such operations has been improved and considerable time and effort has been saved while still achieving a desired result.

Packer 26 is an expandable packer as commonly used in the art. Packer 26 has an unexpanded diameter 44 which permits its movement upwardly and downwardly inside casing 12 and is expandable to have a diameter substantially identical to inside diameter 46 of casing 12 when desired. In normal operation packer 26 is expanded to seal casing 12 when desired and when it is desired to move packer 26 it is contracted to the unextended position. Scraper 28 has an outer diameter somewhat larger than the unextended diameter of packer 26 but smaller than the inside diameter of casing 12. It is thus seen that casing 12 is scraped closely by scraper 28 since the desired diameter of scraper 28 is nearly the same although slightly smaller i.e. as required for free passage, than the diameter of casing 12. In one embodiment cutting means 40 and second cutting means 54 comprise a substantially circular cutting edge having a diameter greater than unextended diameter 44 of packer means 28 and smaller than inside diameter 46 of casing 12. Obviously cutting means 40 and second cutting means 54 are selected from a variety of cutting means, such as for instance a substantially continuous circular cutting edge, a plurality of cutting teeth 48a arranged to form a cutting edge, and the like. Clearly, packer 26 can be moved upwardly and downwardly through casing 12 behind scraper 28.

Scraper 28 is of any suitable material for the use as a scraper such as metals, alloys and the like. Desirably, cutting edges 48 and 54 are hardened to provide an effective cutting edge over a long period of time.

Clearly tubing string 22 is readily positioned in casing 12 and rotatably and vertically moved by means well known to those skilled in the art. The flow of liquids down casing 12 is readily generated by pumping into the casing by a pump (not shown). The methods for performing such techniques are well known to those skilled in the art as evidenced by the fact that the method in conjunction with which the improvement described herein is effective has been known to those skilled to the art heretofore. As noted hereinbefore, numerous techniques for injecting plastic and the like are known and the present apparatus and method are useful as an improvement with such methods.

Having thus described the invention, it is pointed out that the foregoing description of preferred embodiments is illustrative rather than limiting in nature and that many variations and modifications are possible within the scope of the present invention. Many such variations and modifications may be considered obvious or desirable to those skilled in the art upon a review of the foregoing description of preferred embodiments.

Having thus described the invention, I claim:

1. In a method for treating subterranean formations penetrated by a wellbore containing a casing by injecting plastic materials into a selected formation, said method consisting essentially of:
   a. perforating said casing in the portion of said wellbore penetrating said selected formation;
   b. positioning a tubing string in said wellbore so that the lower terminus of said tubing string is below said selected formation;
   c. positioning a packer means above said selected formation;
   d. injecting plastic materials into said selected formation through said tubing string and said perforations;
   e. removing said packer and said tubing string from said wellbore; and
   f. passing a casing scraper through said casing to clean the plastic from the inside diameter of said casing;

the improvement comprising, g. positioning a scraper means beneath said packer means of (c) and above said selected formation;

h. lowering said scraper means past said selected formation after the injection (d) of said plastic materials and prior to removing said packer and said tubing string (e) thus removing plastic from the inside diameter of said casing.

2. The improvement of claim 1 wherein liquid is pumped between said casing and said tubing string, past said packer means and through said scraper means as said scraper means is lowered (h) in said inside diameter of said casing.

* * * * *